(12) United States Patent
Lee et al.

(10) Patent No.: US 12,450,544 B2
(45) Date of Patent: Oct. 21, 2025

(54) ELECTRONIC DEVICE FOR ALLOCATING COURIER AND OPERATING METHOD THEREOF

(71) Applicant: Coupang Corp., Seoul (KR)

(72) Inventors: Hyung Lee, Seoul (KR); Ro Woon Lee, Seoul (KR); Ho Yeon Bae, Seoul (KR); Jae Bong Sung, Seoul (KR); Xiufang Zhu, Seoul (KR); Guofu Liu, Seoul (KR); Xingzhu Gu, Seoul (KR); Hye Leen Choi, Seoul (KR); Yul Hee Lee, Seoul (KR); Kee Young Koh, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/647,716

(22) Filed: Jan. 11, 2022

(65) Prior Publication Data

US 2022/0129824 A1    Apr. 28, 2022

Related U.S. Application Data

(63) Continuation of application No. 17/016,118, filed on Sep. 9, 2020, now Pat. No. 11,250,370.

(30) Foreign Application Priority Data

Jul. 3, 2020    (KR) ........................ 10-2020-0082288

(51) Int. Cl.
*G06Q 10/0639* (2023.01)
*G06Q 10/0833* (2023.01)
*G06Q 10/0835* (2023.01)

(52) U.S. Cl.
CPC ... *G06Q 10/06398* (2013.01); *G06Q 10/0833* (2013.01); *G06Q 10/0835* (2013.01)

(58) Field of Classification Search
CPC ............. G06Q 10/083; G06Q 10/0631; G06Q 10/0833; G06Q 10/08; G06Q 10/06311;
(Continued)

(56) References Cited

U.S. PATENT DOCUMENTS 11,124,401 B1 * 9/2021 Jarvis ................... G05D 1/0234
2009/0089150 A1    4/2009 Lee et al.
(Continued)

FOREIGN PATENT DOCUMENTS

CN    106651233 A    5/2017
CN    107563572 A    1/2018
(Continued)

OTHER PUBLICATIONS

Office Action in Hong Kong Application No. 22020018490.5 dated Oct. 15, 2021 in 6 pages.
(Continued)

*Primary Examiner* — William S Brockington, III
(74) *Attorney, Agent, or Firm* — Knobbe, Martens, Olson & Bear, LLP

(57) ABSTRACT

An operating method of an electronic apparatus including: identifying at least one fulfillment center based on a user input; identifying delivery plan information related to the at least one fulfillment center, a courier allocation condition corresponding to the at least one fulfillment center, and work information of each of a plurality of registered couriers; and allocating at least one among the plurality of couriers to the at least one fulfillment center based on the delivery plan information, the courier allocation condition, and the work information and an electronic apparatus are provided.

18 Claims, 9 Drawing Sheets

(58) Field of Classification Search
CPC ....... G06Q 10/06398; G06Q 10/06315; G06Q 10/06; G06Q 10/063; G06Q 10/0835; G06Q 10/0834; G06Q 10/1097; G06Q 50/30; G06Q 50/28
See application file for complete search history.

(56) References Cited

U.S. PATENT DOCUMENTS

| | | | |
|---|---|---|---|
| 2011/0231335 | A1 | 9/2011 | Kocis |
| 2014/0122143 | A1* | 5/2014 | Fletcher ............. G06Q 10/0631 705/7.14 |
| 2015/0310384 | A1 | 10/2015 | Chen et al. |
| 2016/0247109 | A1* | 8/2016 | Scicluna ................ G08G 1/202 |
| 2017/0185087 | A1 | 6/2017 | Petroff |
| 2017/0193459 | A1* | 7/2017 | Crasso ............... G06Q 10/1097 |
| 2018/0012153 | A1 | 1/2018 | Hu et al. |
| 2018/0174100 | A1 | 6/2018 | Tagami et al. |
| 2018/0314999 | A1 | 11/2018 | Nemati et al. |
| 2018/0315319 | A1 | 11/2018 | Spector et al. |
| 2019/0370742 | A1 | 12/2019 | Ko |
| 2020/0342395 | A1* | 10/2020 | Rajkhowa ......... G06Q 10/06311 |
| 2020/0342558 | A1* | 10/2020 | Rajkhowa .......... G06Q 10/1097 |
| 2020/0411168 | A1* | 12/2020 | Thomas ........... G06Q 10/06311 |
| 2021/0182770 | A1* | 6/2021 | Moon ................ G06Q 10/1093 |

FOREIGN PATENT DOCUMENTS

| | | |
|---|---|---|
| CN | 109165898 A | 1/2019 |
| CN | 109636121 A | 4/2019 |
| CN | 109685429 A | 4/2019 |
| CN | 110334961 A | 10/2019 |
| CN | 110659852 A | 1/2020 |
| CN | 110717690 A | 1/2020 |
| CN | 111080106 A | 4/2020 |
| CN | 111091262 A | 5/2020 |
| CN | 111126921 A | 5/2020 |
| CN | 111191916 A | 5/2020 |
| JP | 2003-122888 A | 4/2003 |
| JP | 2004-323230 A | 11/2004 |
| JP | 10-2009-0032589 1 | 4/2009 |
| JP | 6099216 B2 | 3/2017 |
| JP | 2017-514219 A | 6/2017 |
| JP | 2018-081685 A | 5/2018 |
| JP | 2018-106336 A | 7/2018 |
| JP | 6712339 B2 | 6/2020 |
| KR | 10-2011-0090674 A | 8/2011 |
| KR | 10-2018-0042598 A | 4/2018 |
| KR | 10-2018-0124526 A | 11/2018 |
| KR | 10-1931729 B1 | 12/2018 |
| KR | 10-1972376 B1 | 4/2019 |
| KR | 10-2020-0031357 A | 3/2020 |
| TW | 201927610 A | 7/2019 |
| TW | 202016810 A | 5/2020 |
| TW | 202016811 A | 5/2020 |
| TW | 202020763 A | 6/2020 |
| WO | 2020/003709 A1 | 1/2020 |

OTHER PUBLICATIONS

Herrel, K> (2014). A visual interactive simulation application for minimizing risk and improving outbound logistical efficiency in time-sensitive attended home deliveries and services. Simulatoin, 90(4), 377-404. (Year: 2014).

Office Action of Korean Patent Application No. 10-2021-0057201—6 pages (Sep. 14, 2021).

Office Action dated Apr. 19, 2024 in corresponding Hong Kong patent application No. 22020018490.5.

Office action dated Jan. 30, 2024 in corresponding Taiwanese patent application No. 20200142773.

Office action dated Oct. 15, 2024 in Taiwan patent application No. 113130906 in 10 pp.

* cited by examiner

FIG. 4

Work Allocation

| Camp | Work date | Work type | Nearby area | Backup | | |
|---|---|---|---|---|---|---|
| Gangseo1, Guro1,... ▽ | 2020.04.28 🗓 | LateNight, Early... ▽ | Courier type Flex, Flex... ▽ | Y, N ▽ | Y, N ▽ | Search |

◇ 0%  Total Work Summary ☷ 656 — 411
Rct Amt 22,960 / 23,805

◇ 0  Selected Work Summary — 412
   Simulation  ☷ 0

| Simulation/Work | Conf rate(Conf/Rct) | Unconf No | Rqd Rct Amt | Rct Amt Form Dld | Rct Amt Uld | Selected Item SIM |
|---|---|---|---|---|---|---|
| | | | | Conf Amt | Conf No | Status |
| Same Day Delivery\|Gangseo1 | 97% 910/930 📋 | 10 | 20 | 910 | 26 | Confirmed(1) |
| Same Day Delivery\|Ansan1 | 98% 1,715/1,735 📋 | 17 | 20 | 1,715 | 49 | Confirmed(1) |
| | 403 | 404 | 405 | | | |

FIG. 5

| Simulation Condition | | |
|---|---|---|
| | 501 | result total : 19 |
| Date | Simulation Condition | 502 [+] |
| 2020.04.29 19:18:58 | Reg-Day TEST_120 | |
| 2020.04.28 18:47:06 | Nearby-Day TEST | |
| 2020.04.28 17:05:01 | Fresh-Day 0424. bz | |
| 2020.04.28 16:22:12 | Reg-Day TEST | |
| 2020.04.22 16:43:13 | theo-Day Condition | |
| 2020.04.22 11:06:54 | Condition for TEST | |
| 2020.04.22 09:56:37 | Day Only Condition | |
| 2020.04.22 09:49:43 | GD_Condition | |
| 2020.04.22 09:49:43 | 0417West Early_bz | |
| 2020.04.22 09:48:35 | Fresh-Day(Score3~5) Prio | |

FIG. 6

Simulation Condition                                                              ✕ result total : 19

Date                Simulation Condition                                              +

Create New: Create a simulation condition by registering a new condition.    601   [Close]

┌─ Condition Name ─────────────────────────────────────────────┐
│ Daytime Delivery Condition                                    │  [Save]
└───────────────────────────────────────────────────────────────┘

602   +Exclusion Condition

┌─ User grade type ─┐
│ BRACK          ▽  │
└───────────────────┘

┌─ Days ─┐  ┌─ Work type ──────┐         ┌─ Cmpl ──┐
  In  │   5    │Days│ LateNight, Early... ▽│ Work │ 5 Times │  Below ▽  EXCLUDE
      └────────┘  └──────────────────┘         └─────────┘

┌─ Score ─┐
  Delivery Score    │    3    │  Or Under  EXCLUDE
                    └─────────┘

┌─ Work type ──────┐
  Applicant confirmed   │ LateNight, Early... ▽│  on the Same Date  EXCLUDE
                        └──────────────────┘

+Priority Condition

[Close]

FIG. 7

| Simulation Condition | ✕ |
|---|---|
| | result total : 19 |

Date          Simulation Condition                                          +

Create New: Create a simulation condition by registering a new condition.    [Close]

+Exclusion Condition

701

+Priority Condition

┌─ User type ─┐
│ Flex... ▽   │ PRIORITY ALLOCATION
└─────────────┘

In [Days: 90] Days  [Work type: LateNight, Early... ▽] Work [Min: 0] [Max: 0] Times DeliveryTimes [Ascend ▽] PRIORITY ALLOCATION Score [Min: 0] ~ [Max: 0] Score  [Decend ▽] PRIORITY ALLOCATION

702

+Regional Condition

Allocate in consideration of desired delivery area of the applicant    [Apply: Y ▽]

[Close]

FIG. 8

| Simulation Condition | ✕ | result total : 19

| Date | Simulation Condition | + |

Create New: Create a simulation condition by registering a new condition.　　　Close +Exclusion Condition +Priority Condition +Regional Condition

801

+Quantity Condition

In [Days: 90] Days [Work type: LateNight, Early... ▽] Work [Min: 0] ~ [Max: 0] Times [Amount: 50] ALLOCATION

[Desired Qty: Maximum ▽] of Desired Delivery Qty with [Range: 10] % +/-  ALLOCATION If [Desired Qty: Maximum ▽] of Desired Delivery Qty is [Min: 100] ~ [Max: 150] Max [Couriers: 50] PRIORITY ALLOCATION Close

FIG. 9

| | | | | | | | |
|---|---|---|---|---|---|---|---|
| ◇ 0% | Total Work Summary | ◇ 0 | Selected Work Summary | | | | |
| Rct Amt 22,960 / 23,805 | 🔲 656 | Simulation | 🔲 0 | | | | |

| Simulation/Work | Conf rate(Conf/Rct) | Est. Unconf No | Est. Rqd Rct Amt | | Est. Conf Amt | Est. Conf No | Status |
|---|---|---|---|---|---|---|---|
| | | | | | | | Confirm Selected Item |
| ☐ 2020.04.23 18:17:40 | | 919 | 73,482 | 901 | +226,498 | +1,700 | |
| ☐ Daytime Delivery\|Gimpo1 | 91% 13,205/14,400 | 61 | 1,195 | | +13,205 | +93 | |
| ☐ Daytime Delivery\|Incheon1 | 91% 23,220/25,440 | 118 | 2,220 | | +23,220 | +176 | |
| ☐ Daytime Delivery\|Ansan1 | 91% 20,105/22,080 | 82 | 1,975 | | +20,105 | +152 | |

902

ELECTRONIC DEVICE FOR ALLOCATING COURIER AND OPERATING METHOD THEREOF

CROSS-REFERENCE TO RELATED APPLICATIONS

This application is a continuation of U.S. patent application Ser. No. 17/016,118, filed on Sep. 9, 2020, which claims priority to Korean Application No. 10-2020-0082288, filed Jul. 3, 2020, each of which is incorporated herein by reference in its entirety.

BACKGROUND

Technical Field

The present disclosure relates to an electronic apparatus for allocating a courier to a fulfillment center and an operating method thereof.

Description of the Related Art

As the use of the Internet becomes more common, the e-commerce market is expanding. Since transactions are conducted online in the e-commerce market, a delivery service is accompanied for delivery of the items in which transactions have been made. The delivery service includes a service in which a courier delivers an item ordered by a customer from a fulfillment center in which the item is stored to a delivery destination of the customer.

Delivery destinations may be distributed in various locations across the country, so that one fulfillment center or one courier cannot be in charge of delivery destinations across the country. Accordingly, there may be a plurality of couriers and fulfillment centers storing items. In this case, it is required to allocate couriers to perform the delivery service for each fulfillment center.

In this regard, couriers were manually allocated to the fulfillment center under the supervision of the manager in the past. In this case, it took a lot of time to allocate the couriers and the situation of the fulfillment center was not effectively reflected, resulting in inefficient courier allocation. Therefore, there is a need for a way to allocate couriers to fulfillment centers more efficiently.

SUMMARY

Technical Goals

The problem to be solved by the present embodiment is to provide an electronic apparatus that allocates a courier more efficiently and effectively in consideration of information related to a fulfillment center or a courier, and an operating method thereof.

The technical problems to be solved by the present embodiment are not limited to the technical problems as described above, and other technical problems may be inferred from the following embodiments.

Technical Solutions

According to the first embodiment, an operating method of an electronic apparatus may include: identifying at least one fulfillment center based on a user input; identifying delivery plan information related to the at least one fulfillment center, a courier allocation condition corresponding to the at least one fulfillment center, and work information of each of a plurality of previously registered couriers; and allocating at least one among the plurality of couriers to the at least one fulfillment center based on the delivery plan information, the courier allocation condition, and the work information.

According to the second embodiment, an electronic apparatus may comprise: a memory including instructions; and a processor, and the processor may be connected to the memory to identify at least one fulfillment center based on a user input; identify delivery plan information related to the at least one fulfillment center, a courier allocation condition corresponding to the at least one fulfillment center, and work information of each of a plurality of previously registered couriers; and allocate at least one among the plurality of couriers to the at least one fulfillment center based on the delivery plan information, the courier allocation condition, and the work information.

According to the third embodiment, a computer-readable recording medium is a non-transitory recording medium on which a program for executing an operating method of an electronic apparatus, and the operating method may include: identifying at least one fulfillment center based on a user input; identifying delivery plan information related to the at least one fulfillment center, a courier allocation condition corresponding to the at least one fulfillment center, and work information of each of a plurality of previously registered couriers; and allocating at least one among the plurality of couriers to the at least one fulfillment center based on the delivery plan information, the courier allocation condition, and the work information.

Details of other embodiments are included in the detailed description and drawings.

Effects

According to the present disclosure, an electronic apparatus and an operating method thereof may allow couriers to be allocated more effectively by reflecting the status of the fulfillment center and the courier by allocating the courier to the fulfillment center using information related to the fulfillment center and the courier.

In addition, the electronic apparatus and the operating method thereof analyze information related to a fulfillment center and a courier based on a courier allocation condition, and allocate a courier who is more suitable for a work for each fulfillment center, so that the delivery service can be performed more effectively.

Effects of the invention are not limited to the effects mentioned above, and other effects which are not mentioned will become apparent to those skilled in the art from the description of the claims.

BRIEF DESCRIPTION OF THE DRAWINGS

FIG. 4 is a diagram for explaining a determination of a fulfillment center for courier allocation of an electronic apparatus according to an embodiment.

FIG. 5 is a diagram for explaining a courier allocation condition stored in an electronic apparatus according to an embodiment.

FIGS. 6 to 8 are diagrams for explaining settings of a courier allocation condition of an electronic apparatus according to an embodiment.

FIG. 9 is a diagram for explaining a result of courier allocation by an electronic apparatus according to an embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. However, the present disclosure may be implemented in various different forms but it is not limited to the exemplary embodiments described herein.

Figure 1:
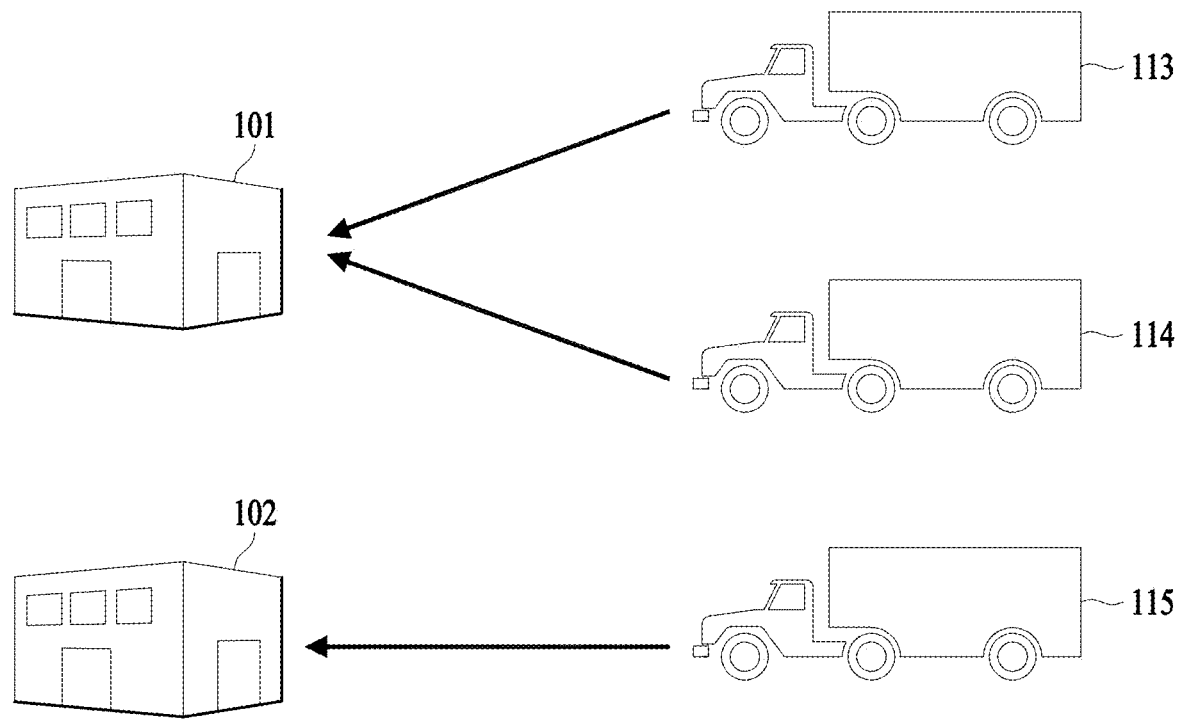
FIG. 1 is a conceptual diagram illustrating an allocation of a courier performed by an electronic apparatus according to an embodiment.

Hereinafter, example embodiments of the present disclosure will be described with reference to the drawings. FIG. 1 is a conceptual diagram illustrating an allocation of a courier performed by an electronic apparatus according to an embodiment.

Referring to FIG. 1, there may be a plurality of fulfillment centers 101 and 102 storing items for delivery service. In addition, there may also be a plurality of couriers 113, 114, and 115 who deliver the items since the items can be delivered to delivery destinations in various locations. The fulfillment centers 101 and 102 may be camp sites located within a specific area, and the couriers 113, 114 and 115 may be full-time couriers or irregular couriers who temporarily deliver items according to needs. An irregular courier who temporarily delivers items according to needs may be referred to as a flex-type courier herein, but the present specification is not limited to such terms and various other terms may be used.

In this case, couriers (e.g., a first courier 113, a second courier 114, and a third courier 115) may be allocated to each fulfillment center (e.g., a first fulfillment center 101, and a second fulfillment center 102), and the couriers allocated to each fulfillment center may be different.

For example, as shown, the first courier 113 and the second courier 114 may be allocated to the first fulfillment center 101, and the third courier 115 may be allocated to the second fulfillment center 115.

As described above, the electronic apparatus according to an embodiment of the present specification may effectively allocate couriers to each fulfillment center by reflecting information on the fulfillment center and the couriers based on the courier allocation condition in allocating couriers for each fulfillment center. Hereinafter, the electronic apparatus will be described in more detail.

Figure 2:
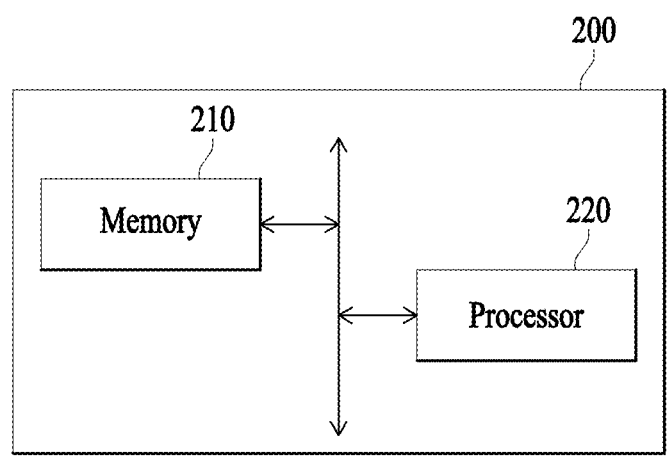
FIG. 2 is a functional block diagram of an electronic apparatus according to an embodiment.

FIG. 2 is a functional block diagram of an electronic apparatus according to an embodiment. Although components related to the present embodiment are illustrated in FIG. 2, the present invention is not limited thereto, and other general-purpose components may be further included in addition to the components illustrated in FIG. 2.

Referring to FIG. 2, an electronic apparatus 200 may comprise a memory 210 and a processor 220. Each of the memory 210 and the processor 220 may mean a unit that processes at least one function or operation, and may be implemented as hardware or software, or a combination of hardware and software depending on embodiments.

The memory 210 may store various data related to the electronic apparatus 200. For example, the memory 210 may store at least one instruction for the operation of the electronic apparatus 200. In this case, the processor 210 may perform various operations of the electronic apparatus 200 to be described later based on at least one instruction.

The processor 220 may control the overall operation of the electronic apparatus 200. For example, the processor 220 may be connected to the memory 210 and execute at least one instruction stored in the memory 210 to control the overall operation of the electronic apparatus 200. The processor 220 may be configured with at least one microprocessor, but the present specification is not limited by this implementation method.

The processor 220 may identify at least one fulfillment center based on a user input. In an embodiment, the processor 220 may receive a user input for selecting at least one among a plurality of fulfillment centers. The processor 220 may identify the at least one fulfillment center corresponding to the received user input. Here, the fulfillment center may be a camp site located within a specific area, and a courier is allocated to the fulfillment center so that items of the fulfillment center can be delivered by the courier.

In an embodiment, the processor 220 may identify information on one or more fulfillment centers that satisfy a specific condition among the plurality of fulfillment centers. When the information on the one or more fulfillment centers satisfying the specific condition is identified, the processor 220 may display the information on the identified one or more fulfillment centers. The processor 220 may identify the at least one fulfillment center based on an input of a user selecting the at least one of the one or more fulfillment centers.

In an embodiment, the specific condition may include at least one of a name of a fulfillment center, a scheduled delivery date (or work date), a delivery work type, a courier type, a location of the fulfillment center, and backup status. The name of the fulfillment center includes a name specified for the fulfillment center, the scheduled delivery date includes a work date to perform courier allocation, and the delivery work type is a delivery type related to the delivery time, and it may include at least one of late night delivery, daytime delivery and early morning delivery, for example. The courier type is pre-specified information for each courier, and it may include information such as, for example, whether the courier works flexibly or only at a specific time, or whether the courier is a full-time courier or an irregular courier who temporarily delivers items according to needs, but is not limited thereto. The backup status may include information on whether a courier allocation has been previously performed and information thereof is stored. Such a specific condition may be determined based on a user input, but is not limited thereto and may be specified in advance. For a more specific example related to this, refer to FIG. 4.

The processor 220 may identify delivery plan information related to at least one fulfillment center, a courier allocation condition corresponding to the at least one fulfillment center, and work information of each of a plurality of previously registered couriers.

The delivery plan information is information related to the delivery of items stored in at least one fulfillment center. It may include information on at least one of, for example, the number of items to be delivered, the number of couriers required to be allocated, the number of already allocated couriers, and the number of items for which delivery is confirmed for each of at least one fulfillment center.

The courier allocation condition is a condition for allocating a courier to a fulfillment center. It may be related to at least one of an evaluation rating of the courier, a date of the courier's immediate previous work, a delivery evaluation score of the courier, the number of delivery completions by the courier, a work type requested by the courier, a type of courier, a desired delivery area of the courier, and a desired delivery quantity of the courier.

In some cases, the courier allocation condition may be divided into detailed conditions including at least one of a condition to be excluded, a condition to be considered first, a regional condition, and a quantity condition, and the courier allocation condition may be determined based on the detailed conditions. For example, assume that the condition that the courier's evaluation rating is 5 is entered as the condition to be excluded and the condition that the courier's evaluation rating is 1 is entered as the condition to be considered first in relation to the courier allocation. Then, when allocating a courier, a courier with a rating of 5 is excluded and priority is given to a courier with a rating of 1 so that the allocation can be confirmed. For a more detailed description related to this, refer to FIGS. 6 to 8.

The courier's evaluation rating is work evaluation information determined in advance based on the courier's past delivery work. This may appear, for example, as a number-based rating such as a rating of 1 or 2, or a color-based rating as a rating of black or red, but is not limited thereto and may appear in various forms. The delivery evaluation score of a courier may include a predetermined score evaluated based on the courier's past delivery work. The number of delivery completions of a courier may include the number of times the courier completed a delivery of the item in the past. The work type requested by the courier is a type of delivery work requested by the courier, and may include, for example, at least one of late night delivery, early morning delivery, and daytime delivery, but is not limited thereto. The type of courier is information previously designated for each courier, and may include, for example, information such as whether the courier works flexibly or works only at a specific time, but is not limited thereto. The desired delivery area of a courier includes an area requested by the courier, in which the courier wants to perform a delivery work. The desired delivery quantity of a courier may include a quantity of items that the courier wants to deliver, requested by the courier.

The work information for each of a plurality of couriers is pre-specified information related to work for each of the plurality of couriers. For example, it may include information on at least one of an evaluation rating, a date of the immediate previous work, a delivery evaluation score, the number of delivery completions, a requested work type, a courier type, a desired delivery area, and a desired delivery quantity of each courier.

In an embodiment, such work information may include information determined for each courier based on past work of each of the plurality of couriers or information requested from the courier (or information received from the courier's terminal). The work information may be different for each of the plurality of couriers, but is not limited thereto.

In an embodiment, the processor 220 may store information on the courier allocation condition in response to identification of the courier allocation condition. The stored information may be provided when an operation for allocating a courier is to be performed again later, and a specific example related thereto may be referred to FIG. 5.

The processor 220 may allocate at least one among the plurality of couriers to at least one fulfillment center based on the delivery plan information, the courier allocation condition and the work information.

In an embodiment, when at least one fulfillment center is identified, the processor 220 may provide a screen for inputting a courier allocation condition. When a user input for the courier allocation condition is received through the provided screen, the courier allocation condition can be identified based on the received input. The processor 220 may identify at least one courier that satisfies the courier allocation condition among the plurality of couriers based on the identified work information. More specifically, the processor 220 may identify at least one courier that meets the identified courier allocation condition and delivery plan information among the plurality of couriers based on work information of the plurality of couriers previously registered. The processor 220 may allocate the identified courier to at least one fulfillment center.

In an embodiment, when the number of the identified couriers exceeds the number corresponding to the delivery plan information, the processor 220 may determine the number of couriers corresponding to the delivery plan information among the identified couriers based on a condition to be considered first among the courier allocation condition.

For example, the processor 220 may identify the delivery plan information of the first fulfillment center based on the identification of the first fulfillment center. The delivery plan information may include information indicating that 10 couriers are required at the first fulfillment center, and in this case, the processor 220 may allocate 10 couriers satisfying the courier allocation condition among a plurality of couriers previously registered for the performance of delivery work to the first fulfillment center. In some cases, if there are less than 10 couriers who satisfy the courier allocation condition, only the couriers who satisfy the courier allocation condition may be allocated to the first fulfillment center. If there are more than 10 couriers satisfying the courier allocation conditions, 10 couriers may be selected and allocated to the first fulfillment center based on the condition to be considered first among the courier allocation conditions.

In some cases, the screen for inputting the courier allocation condition may include an area for receiving a user's input on at least one of a condition to be excluded, a condition to be considered first, a regional condition, and a quantity condition in relation to the courier allocation. In this case, conditions may be input for each area, and conditions may be considered according to the characteristics of each area to allocate a courier to a fulfillment center.

In an embodiment, the processor 220 may calculate at least one of a courier allocation confirmation rate and the number of unconfirmed couriers for each of the at least one fulfillment center based on an allocation of the at least one courier to the at least one fulfillment center. The processor 220 may display at least one of the calculated courier allocation confirmation rate and the number of unconfirmed couriers. Accordingly, the user of the electronic apparatus 200 may identify the rate of the confirmed couriers for each of at least one fulfillment center. For a specific example related to this, refer to FIG. 9.

Although not shown, according to an embodiment, the electronic apparatus 200 may further comprise a display device such as a display. In this case, the screen for displaying the above-described courier allocation condition may be displayed through the display device.

According to an embodiment, the electronic apparatus 200 may be implemented as a device such as a computer, but is not limited thereto and may be implemented in the form of a server. In this case, the server may be connected to the display device to perform the display operation according to the exemplary embodiment of the present specification.

In an embodiment, the electronic apparatus 200 may determine whether to confirm the allocation when courier allocation is completed. Specifically, when a courier is allocated to at least one fulfillment center based on delivery plan information, courier allocation condition, and work information, the electronic apparatus 200 identifies the information and then performs reallocation using other conditions, or confirms the courier allocation. When reallocation is performed, the allocation of the courier is initialized, and the number of unconfirmed couriers and the courier allocation confirmation rate may correspond to those before the courier allocation. If the courier allocation is confirmed, the number of unconfirmed couriers and the courier allocation confirmation rate may be changed in response to the confirmed courier.

Figure 3:
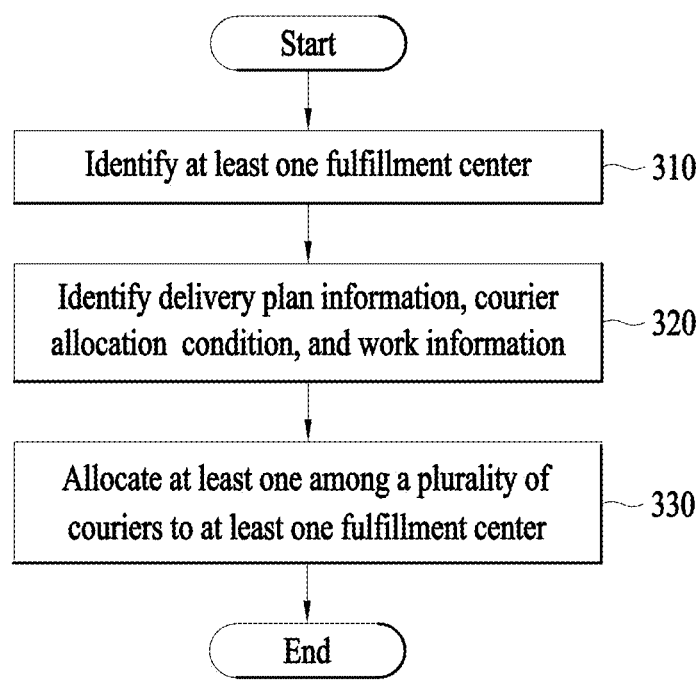
FIG. 3 is a flowchart of each step of an operating method of an electronic apparatus according to an embodiment.

FIG. 3 is a flowchart of each step of an operating method of an electronic apparatus according to an embodiment. Each step of the method illustrated in FIG. 3 may be performed in a different order from that illustrated in the drawings depending on the case. Hereinafter, contents duplicated with the contents illustrated in FIGS. 1 to 2 may be omitted.

In operation 310 of FIG. 3, the electronic apparatus may identify at least one fulfillment center. As an example, the electronic apparatus may receive an input of a user selecting at least one fulfillment center, and may identify at least one fulfillment center corresponding to the received user input.

In some cases, the electronic apparatus may identify one or more fulfillment centers corresponding to a specific condition among a plurality of fulfillment centers in which a courier can be allocated. Based on a user input for selecting at least some of the identified one or more fulfillment centers, the electronic apparatus may identify at least one fulfillment center corresponding to the user input. Herein, the specific condition regarding the identification of the one or more fulfillment centers may relate to at least one of, for example, a location of the fulfillment center, a delivery work type, a scheduled delivery date, a courier type, and a name of the fulfillment center, and for a more specific example related to this, refer to FIG. 4.

In operation 320, the electronic apparatus may identify delivery plan information, a courier allocation condition, and work information. Specifically, the electronic apparatus may identify the delivery plan information related to at least one fulfillment center, the courier allocation condition corresponding to the at least one fulfillment center, and work information of each of a plurality of previously registered couriers.

The delivery plan information may be information previously designated in relation to delivery of items in relation to each of the at least one fulfillment center. The courier allocation condition may be determined based on a user input, but is not limited thereto and may be specified in advance. The plurality of previously registered couriers are those registered in advance for the delivery of items. For example, the plurality of couriers may correspond to couriers who applied for delivery works among all couriers registered in a pool of couriers who have a history of performing delivery works, or who can perform delivery works. However, it is not limited thereto, and a plurality of pre-designated couriers may be included regardless of the application by the couriers themselves.

In operation 330, the electronic apparatus may allocate at least one among the plurality of couriers to the at least one fulfillment center. Specifically, the electronic apparatus may allocate at least one among the plurality of couriers to the at least one fulfillment center based on at least one of the delivery plan information, the courier allocation condition, and the work information.

In an embodiment, the electronic apparatus may display a screen for inputting a courier allocation condition based on the identification of at least one fulfillment center. When an input for the courier allocation condition is received through the displayed screen, the electronic apparatus may identify the courier allocation condition corresponding to the received input. The electronic apparatus may allocate at least one courier to the fulfillment center by identifying at least one courier corresponding to the identified courier allocation condition based on the work information of each of the plurality of couriers.

In some cases, the electronic apparatus may allocate at least some of the at least one courier to at least one fulfillment center based on the delivery plan information. For example, the electronic apparatus may identify whether the number of the at least one courier corresponding to the courier allocation condition meets the delivery plan information. If the number of the at least one courier exceeds the number of couriers required in the delivery plan information, the electronic apparatus may select some of the at least one courier and allocate them to the fulfillment center.

In an embodiment, the electronic apparatus may select some of the at least based on a condition to be considered first among the courier allocation conditions. For example, if the condition to be considered first among the courier allocation conditions is the delivery evaluation score of the courier in descending order, the electronic apparatus may select the number of couriers required by the fulfillment center (e.g., 10 couriers) among the at least one courier in the order of the highest delivery evaluation score.

In an embodiment, the electronic apparatus may calculate at least one of a courier allocation confirmation rate and a number of unconfirmed couriers for each of the at least one fulfillment center based on the courier allocation. The electronic apparatus may display at least one of the calculated courier allocation confirmation rate and the number of unconfirmed couriers. For a specific example related to this, refer to FIG. 9.

FIG. 4 is a diagram for explaining a determination of a fulfillment center for allocating a courier of an electronic apparatus according to an embodiment. Specifically, FIG. 4 shows an example of a screen for selecting at least one fulfillment center for allocation of a courier. The screen shown in FIG. 4 may be displayed on a display device of the electronic apparatus.

Referring to FIG. 4, the electronic apparatus may selectively display a recruitment amount area 411 and a simulation area 412. The screen as shown in FIG. 4 may be displayed based on the selection for the recruitment amount area 411.

In an embodiment, the electronic apparatus may display the first area 401 for setting a specific condition to select at least some of the plurality of fulfillment centers. As shown, the first area 401 may include an input portion for setting a specific condition. Specifically, a name of the fulfillment center may be input in relation to a 'Camp' section, and a scheduled delivery date may be input in relation to a 'Work date' section. A type of delivery work may be input in relation to a 'Work type' section, and a courier type may be input in relation to a 'Courier type' section. In relation to a 'Nearby area' section, it may be determined whether to filter camps in the surrounding area based on the location of the fulfillment center input in the 'Camp' section. For example, if 'Y' is entered in the 'Nearby area' section, camps in the surrounding area are selected based on the location of the fulfillment center input in the 'Camp' section. When 'N' is entered, camps in the surrounding area may not be selected together. The 'Backup' section is a filtering condition for camps that have previously been allocated a courier. 'Y' can be entered if filtering of camps that have previously been allocated a courier is desired. 'N' can be entered if filtering of camps that have not previously been allocated a courier is desired. However, this is only an example, and the part related to the input of the specific condition described above is not limited to the above-described use and may be changed and used for various purposes.

When the input for the search button 402 is received after the input for the specific condition section in the first area 401 is completed, the electronic apparatus may display at least one fulfillment center that satisfies a specific condition among all fulfillment centers where a courier can be allocated as shown in FIG. 4. Referring to FIG. 4, at least one fulfillment center that satisfies a specific condition may include a fulfillment center corresponding to 'Gangseo 1, Ansan 1'. Here, 'Gangseo 1, Ansan 1' may correspond to the name of the fulfillment center.

As illustrated, the electronic apparatus may display information on the work type, the confirmation rate, the unconfirmed number of couriers, and the required recruitment amount for each fulfillment center. The work type represents the work type of item delivery of the fulfillment center. The confirmation rate may be displayed in a confirmation rate area 403, and indicates a ratio of the number of confirmed couriers among the number of couriers required to be allocated. In some cases, information on the recruitment amount (e.g., 930) and the confirmed number of couriers (e.g., 910) may be displayed in the confirmation rate area 403.

The unconfirmed number of couriers may be displayed in an unconfirmed number of couriers area 404, and represents the number of couriers for which confirmation is additionally required, that is, the number of couriers that have not yet been confirmed. The required recruitment amount may be displayed in a required recruitment amount area 405, and indicates the number of items for which delivery has not been confirmed because a courier is not allocated.

In addition, as illustrated according to an embodiment, the electronic apparatus may display information on a confirmed amount, a confirmed number of couriers, and a status. The confirmed amount represents the number of items that have been confirmed to be delivered according to the allocation of couriers, and the confirmed number of couriers represents the number of confirmed couriers. The status may indicate whether the displayed information related to the allocation of the courier is confirmed information or simulation information provided before the confirmation, but is not limited thereto and may be used for various purposes.

The delivery plan information of the fulfillment center may include at least some of the displayed information. For example, the unconfirmed number and the required recruitment amount may be included in the delivery plan information of the fulfillment center.

In an embodiment, the delivery plan information for each fulfillment center may be uploaded through an input to the 'Recruitment Amount Upload (Rct Amt Uld)' section. Based on the uploading of the delivery plan information, as shown in FIG. 4, information such as a confirmation rate, an unconfirmed number of couriers, a required recruitment amount, a confirmed amount, a confirmed number of couriers, and a status may be displayed. In some cases, the form of delivery plan information to be uploaded may be specified in advance. In this case, the information on the form may be provided in response to an input to the 'Requested Recruitment Amount Form Download (Rct Amt Form Dld)' section.

In an embodiment, the electronic apparatus may receive a user input for at least one fulfillment center. For example, the electronic apparatus may receive a selection input for at least some of check boxes corresponding to each of the at least one fulfillment center and an input for a 'Selected Item Simulation (Selected Item SIM)' section. Accordingly, the electronic apparatus may identify the fulfillment center corresponding to the selected check box as at least one fulfillment center for allocation of a courier.

FIG. 5 is a diagram for explaining a courier allocation condition stored in an electronic apparatus according to an embodiment. Specifically, FIG. 5 shows a screen providing information on the courier allocation condition which has been set in advance for allocation of a courier.

Referring to FIG. 5, in the first area 501, information on the courier allocation condition set in advance in correspondence with the setting time of the courier allocation condition may be displayed. The information on the courier allocation condition may include the name of the courier allocation condition specified by the user at the time of setting the courier allocation condition.

In an embodiment, when one of the courier allocation conditions displayed in the first area 501 is selected, the courier allocation to at least one fulfillment center selected through FIG. 4 may be made based on the selected courier allocation condition.

If a courier is to be allocated using a new courier allocation condition, the user may set the courier allocation condition based on the input to the second area 502. Specifically, when an input for the second area 502 is received, the electronic apparatus may display a screen as shown in FIGS. 6 to 8, and a user inputs a courier allocation condition based on the displayed screen to allocate a courier to at least one fulfillment center. The courier allocation condition newly set as described above may be stored, and in this case, information on the stored courier allocation condition may be added in the first area 501.

According to an embodiment, when setting the courier allocation condition, information on the user who has set the courier allocation condition may be stored together. In this case, the first area 501 may display information on the user who has set the courier allocation condition together with the setting time of the courier allocation condition.

In an embodiment, the courier allocation condition may be obtained from another electronic apparatus. For example, based on a connection with another electronic apparatus, the electronic apparatus may receive information on the courier allocation condition. In this case, information on the courier allocation condition received from another electronic apparatus may be displayed in the first area 501.

According to the embodiment as shown in FIG. 5, when a user wants to perform courier allocation multiple times under the same courier allocation condition, the courier allocation can be made easily and quickly without setting the courier allocation condition each time.

FIGS. 6 to 8 are diagrams for explaining setting of a courier allocation condition of an electronic apparatus according to an embodiment. Specifically, FIGS. 6 to 8 show an example of setting the courier allocation condition by dividing it into detailed conditions (e.g., exclusion conditions, priority conditions, regional conditions, and quantity conditions).

Referring to FIG. 6, a first area 601 for setting a name of a courier allocation condition and a second area 602 for setting a detailed condition corresponding to an exclusion condition among the courier allocation conditions may be displayed. Texts may be input in the first area 601, and the name of the courier allocation condition may be set in correspondence with the input texts.

In the second area 602, conditions of the couriers to be excluded from allocation in relation to the courier allocation may be input. For example, in the second area 602, information on the evaluation grade of the courier is input in the 'User grade type' section, information related to days of the courier's immediate previous work is input in the 'Days' section, information on a work type requested by the courier is input in the 'Work type' section, and information on the number of delivery completions by the courier is input in the 'Delivery Completion Count (Cmpl)' section.

In some cases, as shown, information on delivery score or additional conditions to be excluded in relation to the work type (e.g., an applicant with the delivery score of less than 3, an applicant confirmed for both late night and early morning delivery works on the same work date) can be entered.

However, this is only an example, and embodiments of the present specification are not limited as shown, and for example, some conditions may be omitted or some conditions may be added.

Based on the condition corresponding to the information input in the second area 602, the electronic apparatus may identify couriers to be excluded from allocation.

Referring to FIG. 7, a third area 701 for setting a condition to be considered first for courier allocation and a fourth area 702 for setting a regional condition related to courier allocation may be displayed.

In the third area 701, information on a condition that should first be satisfied (hereinafter, a 'priority condition') for courier allocation may be input. For example, in the third area 701, information on the courier type is input in the 'User type' section, information related to days of the courier's immediate previous work is input in the 'Days' section, and information on the work type requested by the courier such as late night delivery or early morning delivery may be input in the 'Work type' section. Based on this input, the electronic apparatus may prioritize, for example, couriers who have performed 4 to 9 late night delivery works within 90 days, in ascending order of delivery times. In addition, the electronic apparatus may prioritize couriers with delivery scores of 3 to 5 in descending order of delivery scores.

In some cases, the priority condition may be used when the number of couriers satisfying the courier allocation condition exceeds the number of allocated couriers required by at least one fulfillment center. For example, if the number of allocated couriers required in the fulfillment center is 20, and the number of couriers who satisfy the courier allocation condition is 30, 20 out of 30 couriers may be determined based on the priority condition.

In the fourth area 702, information on a regional condition for courier allocation may be input. For example, in the fourth area 702, a condition for whether to allocate a courier in consideration of a desired delivery area of the courier may be input. When 'Y' is entered in the fourth area 702, a condition for considering the desired delivery area may be added to the courier allocation condition. If 'N' is entered in the fourth area 702, a condition not considering the desired delivery area may be added to the courier allocation condition.

Referring to FIG. 8, a fifth area 802 for setting a quantity condition for courier allocation may be displayed. The quantity condition may include a condition for allocating the number of items for delivery by couriers. The number of couriers who will deliver items that are requested to be delivered from at least one fulfillment center may be determined based on the quantity condition.

In an embodiment, the number of items that can be delivered may be different according to the work information of a courier, and the quantity condition may include a condition in which items are allocated for each courier in consideration of the work information of the courier. For example, a quantity condition may be set such that 50 items are allocated to a courier who performed 30 to 40 times of late night delivery works within 90 days.

In an embodiment, FIGS. 6 to 8 may be sequentially displayed based on a scroll operation. For example, when an operation of scrolling the screen down on the screen corresponding to FIG. 6 is input, the screens corresponding to FIGS. 7 and 8 may be sequentially displayed. A user of the electronic apparatus may input a condition in a desired area by using a scroll operation in relation to the courier allocation condition.

When the input of the courier allocation condition is completed and an input for confirming the courier allocation condition is received, the electronic apparatus may identify the courier allocation condition and allocate a courier to at least one fulfillment center. The input for confirming the courier allocation condition may be received in a predetermined area (e.g., a 'save' button included in the first area 601 of FIG. 6).

FIG. 9 is a diagram for explaining a result of courier allocation by an electronic apparatus according to an embodiment. Specifically, FIG. 9 shows an example of a screen displayed when the courier allocation to at least one fulfillment center is completed based on the courier allocation condition.

In an embodiment, the electronic apparatus may calculate at least one of a confirmation rate, the number of unconfirmed couriers, and the number of items for which delivery is unconfirmed in response to the courier allocation for at least one fulfillment center. The electronic apparatus may display the calculated information.

Referring to FIG. 9, when at least one fulfillment center to which the courier allocation is performed is plural, information on the result of the courier allocation to all of the at least one fulfillment center may be displayed through the first area 901. Information on the courier allocation to each of the at least one fulfillment center may be displayed through the second area 902.

For example, the first area 901 may display information about the estimated number of unconfirmed couriers, the estimated amount required for recruitment, the estimated confirmed amount, and the estimated number of confirmed couriers for the at least one fulfillment center in total. The estimated number of unconfirmed couriers may include the number of couriers required additionally in case the number of couriers required by the at least one fulfillment center is not allocated despite the courier allocation under the courier allocation condition. The estimated amount required for recruitment may include the number of items for which delivery has not been confirmed despite the courier allocation under the courier allocation condition. The estimated confirmed amount may include the number of items scheduled for delivery that is confirmed by the courier allocation under the courier allocation condition. The estimated number of confirmed couriers may include the number of couriers allocated according to the courier allocation condition.

The confirmation rate may be displayed individually for each of the at least one fulfillment center as shown, but is not limited thereto.

In an embodiment, the electronic apparatus may receive an input for check boxes for selecting at least some of the at least one fulfillment center and an input for a 'Confirm Selected Item' section. In this case, the courier allocation to the fulfillment center corresponding to the selected check box may be confirmed. For the fulfillment center corresponding to the unselected check box, the courier allocation is not confirmed, and it is returned to the status before the courier allocation.

In an embodiment, information as shown in FIG. 9 related to the courier allocation may be stored. For example, the information related to the courier allocation may be saved as a file according to a designated format (e.g., Excel™).

According to the present disclosure, couriers may be allocated more effectively by reflecting the statuses of the fulfillment center and the courier by allocating the courier to the fulfillment center using information related to the fulfillment center and the courier.

In addition, the electronic apparatus and an operating method thereof analyze information related to a fulfillment center and a courier (e.g., delivery plan information, work information) based on a courier allocation condition, and allocate a courier more suitable for a work for each fulfillment center, so that delivery service can be performed more effectively.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. A method operable by an electronic apparatus comprising:

displaying a first user interface, the first user interface including a first portion indicating at least one fulfillment center and delivery plan information related to the at least one fulfillment center and a first user interface element configured to, upon user activation, initiate an allocation simulation for the at least one fulfillment center;

displaying a second user interface, the second user interface including a plurality of user interface elements each user-configurable to specify one of a plurality of simulated exclusion conditions for excluding couriers in connection with courier allocation;

identifying work information of each of a plurality of previously registered couriers;

identifying a courier allocation condition corresponding to the at least one fulfillment center based at least in part on one or more of the plurality of simulated exclusion conditions user-configurable via the plurality of user interface elements on the second user interface;

upon detecting that a user has activated the first user interface element, performing the allocation simulation to allocate at least one among the plurality of previously registered couriers to the at least one fulfillment center based on the plurality of simulated exclusion conditions, the delivery plan information, the courier allocation condition, and the work information;

updating the first user interface to include a second portion of the first user interface indicating a result of the allocation simulation based on the plurality of simulated exclusion conditions, the delivery plan information, the courier allocation condition, the work information, and a second user interface element configured to, upon activation by the user, apply the result of the allocation simulation to one or more selected fulfillment centers; and applying the result of the allocation simulation to the one or more selected fulfillment centers in response to the second user interface element being activated, wherein the performing includes identifying the at least one among the plurality of previously registered couriers that satisfied the courier allocation condition, based on the delivery plan information, wherein at least one of the plurality of simulated exclusion conditions is related to the work information of each courier, wherein the work information includes information determined for each courier based on past work or information requested from each courier, wherein the one or more of the plurality of simulated exclusion conditions include:

a first simulated exclusion condition related to a courier whose number of delivery works of a first work type performed within a configured period of time is less than or equal to a configured number; and a second simulated exclusion condition related to a courier who is assigned to a work of a second work type on a same work day, wherein a work type of delivery is related to delivery time, and wherein each of the first work type and the second work type is one of late night delivery, daytime delivery and early morning delivery, wherein the identifying of the courier allocation condition includes at least one of:

obtaining, via a third user interface element among the plurality of user interface elements, a first user input related to the first work type and the configured number; and obtaining, via a fourth user interface element among the plurality of user interface elements, a second user input related to the second work type.

2. The method of claim 1, wherein the delivery plan information includes at least one of:

information on a number of couriers required to be allocated to each of the at least one fulfillment center; or a number of couriers already allocated to each of the at least one fulfillment center.

3. The method of claim 1, wherein identifying at least one fulfillment center includes:

identifying one or more fulfillment centers satisfying a specific condition among a plurality of fulfillment centers; and identifying the at least one fulfillment center based on a fifth user input selecting at least one from the one or more fulfillment centers.

4. The method of claim 3, wherein the specific condition is related to at least one of:

a location of a fulfillment center;

the work type of the delivery;

a scheduled delivery date;

a courier type; or a name of the fulfillment center.

5. The method of claim 1, wherein the courier allocation condition is related to at least one of:

an evaluation rating of a courier;

a date of immediate previous work of the courier;

a number of delivery completions by the courier;

a work type requested by the courier;

a third type of the courier;

a desired delivery area of the courier; or a desired delivery quantity of the courier.

6. The method of claim 1, wherein identifying the delivery plan information, the courier allocation condition, and the work information includes:

displaying a screen for determining the courier allocation condition upon identifying the delivery plan information.

7. The method of claim 1, further comprising:

storing information on the identified courier allocation condition in response to the identifying the courier allocation condition.

8. The method of claim 1, wherein the work information of each of the plurality of couriers includes information on at least one of:

an evaluation rating;

a date of an immediate previous work;

a number of delivery completions;

a requested work type;

a courier type;

a desired delivery area; or a desired delivery quantity of each of the plurality of couriers.

9. The method of claim 1, wherein the allocating further includes:

in response to a number of the identified couriers exceeding a number corresponding to the delivery plan information, determining the number of couriers corresponding to the delivery plan information among the identified couriers based on a condition to be considered first among the courier allocation condition.

10. The method of claim 1, further comprising:

calculating at least one of a courier allocation confirmation rate or a number of unconfirmed couriers for each of the at least one fulfillment center based on an allocation of the at least one courier to the at least one fulfillment center; and displaying at least one of the calculated courier allocation confirmation rate or the number of unconfirmed couriers.

11. The method of claim 1, wherein the one or more of the plurality of simulated exclusion conditions further include:

a third simulated exclusion condition related to a courier whose grade type is a configured grade type; or a fourth simulated exclusion condition related to a courier whose delivery score is less than a configured value.

12. The method of claim 1, wherein the identifying of the courier allocation condition further includes:

obtaining, via a fifth user interface element among the plurality of user interface elements, a third user input related to the configured grade type; or obtaining, via a sixth user interface element among the plurality of user interface elements, a fourth user input related to the configured value.

13. An electronic apparatus comprising:
a memory including instructions; and
a processor, wherein the processor is connected to the memory and configured to:
display a first user interface, the first user interface including a first portion indicating at least one fulfillment center and delivery plan information related to the at least one fulfillment center and a first user interface element configured to, upon user activation, initiate an allocation simulation for the at least one fulfillment center;
display a second user interface, the second user interface identifying a plurality of user interface elements each user-configurable to specify a plurality of simulated exclusion conditions for excluding couriers in connection with courier allocation;
identify work information of each of a plurality of previously registered couriers;
identify a courier allocation condition corresponding to the at least one fulfillment center based at least in part on one or more of the plurality of simulated exclusion conditions user-configurable via the plurality of user interface elements on the second user interface;
upon detecting that a user has activated the first user interface element, performing the allocation simulation to allocate at least one among the plurality of previously registered couriers to the at least one fulfillment center based on the plurality of simulated exclusion conditions, the delivery plan information, the courier allocation condition, and the work information;
update the first user interface to include a second portion of the first user interface indicating a result of the allocation simulation based on the plurality of simulated exclusion conditions, the delivery plan information, the courier allocation condition, the work information, and a second user interface element configured to, upon activation by the user, apply the result of the allocation simulation to one or more selected fulfillment centers; and
apply the result of the allocation simulation to the one or more selected fulfillment centers in response to the second user interface element being activated,
wherein the performing includes identifying the at least one among the plurality of previously registered couriers that satisfied the courier allocation condition, based on the delivery plan information,
wherein at least one of the plurality of simulated exclusion conditions is related to the work information of each courier,
wherein the work information includes information determined for each courier based on past work or information requested from each courier,
wherein the one or more of the plurality of simulated exclusion conditions include:
a first simulated exclusion condition related to a courier whose number of delivery works of a first work type performed within a configured period of time is less than or equal to a configured number; and
a second simulated exclusion condition related to a courier who is assigned to a work of a second work type on a same work day, wherein a work type of delivery is related to delivery time, and wherein each of the first work type and the second work type is one of late night delivery, daytime delivery and early morning delivery, wherein the identifying of the courier allocation condition includes at least one of:

obtaining, via a third user interface element among the plurality of user interface elements, a first user input related to the first work type and the configured number; and obtaining, via a fourth user interface element among the plurality of user interface elements, a second user input related to the second work type.

14. The electronic apparatus of claim 13, wherein the one or more of the plurality of simulated exclusion conditions further include:
a third simulated exclusion condition related to a courier whose grade type is a configured grade type; or
a fourth simulated exclusion condition related to a courier whose delivery score is less than a configured value.

15. The electronic apparatus of claim 13, wherein the identifying of the courier allocation condition further includes:
obtaining, via a fifth user interface element among the plurality of user interface elements, a third user input related to the configured grade type; or
obtaining, via a sixth user interface element among the plurality of user interface elements, a fourth user input related to the configured value.

16. A non-transitory computer-readable recording medium having instructions that, when executed by a hardware processor, are configured to cause the hardware processor to:
display a first user interface, the first user interface including a first portion indicating at least one fulfillment center and delivery plan information related to the at least one fulfillment center and a first user interface element configured to, upon user activation, initiate an allocation simulation for the at least one fulfillment center;
display a second user interface, the second user interface identifying a plurality of user interface elements each user-configurable to specify one of a plurality of simulated exclusion conditions for excluding couriers in connection with courier allocation;
identify work information of each of a plurality of previously registered couriers;
identify a courier allocation condition corresponding to the at least one fulfillment center based at least in part on one or more of the plurality of simulated exclusion conditions user-configurable via the plurality of user interface elements on the second user interface;
upon detecting that a user has activated the first user interface element, perform the allocation simulation to allocate at least one among the plurality of previously registered couriers to the at least one fulfillment center based on the plurality of simulated exclusion conditions, the delivery plan information, the courier allocation condition, and the work information;
update the first user interface to include a second portion of the first user interface indicating a result of the allocation simulation based on the plurality of simulated exclusion conditions, the delivery plan information, the courier allocation condition, the work information, and a second user interface element configured to, upon activation by the user, apply the result of the allocation simulation to one or more selected fulfillment centers; and apply the result of the allocation simulation to the one or more selected fulfillment centers in response to the second user interface element being activated, wherein the performing includes identifying the at least one among the plurality of previously registered couriers that satisfied the courier allocation condition, based on the delivery plan information, wherein at least one of the plurality of simulated exclusion conditions is related to the work information of each courier, wherein the work information includes information determined for each courier based on past work or information requested from each courier, wherein the one or more of the plurality of simulated exclusion conditions include:

a first simulated exclusion condition related to a courier whose number of delivery works of a first work type performed within a configured period of time is less than or equal to a configured number; and a second simulated exclusion condition related to a courier who is assigned to a work of a second work type on a same work day, wherein a work type of delivery is related to delivery time, and wherein each of the first work type and the second work type is one of late night delivery, daytime delivery and early morning delivery, wherein the identifying of the courier allocation condition includes at least one of:

obtaining, via a third user interface element among the plurality of user interface elements, a first user input related to the first work type and the configured number; and obtaining, via a fourth user interface element among the plurality of user interface elements, a second user input related to the second work type.

17. The non-transitory computer-readable recording medium of claim 16, wherein the one or more of the plurality of simulated exclusion conditions further include:

a third simulated exclusion condition related to a courier whose grade type is a configured grade type; or a fourth simulated exclusion condition related to a courier whose delivery score is less than a configured value.

18. The non-transitory computer-readable recording medium of claim 16, wherein the identifying of the courier allocation condition further includes:

obtaining, via a fifth user interface element among the plurality of user interface elements, a third user input related to the configured grade type; or obtaining, via a sixth user interface element among the plurality of user interface elements, a fourth user input related to the configured value.

\* \* \* \* \*